(12) United States Patent
Wong et al.

(10) Patent No.: US 8,502,153 B2
(45) Date of Patent: Aug. 6, 2013

(54) METHODS, SYSTEMS AND DEVICES FOR CROSSTALK MEASUREMENT AND CANCELLATION IN OPTICAL PROXIMITY SENSORS

(75) Inventors: Chee Heng Wong, Singapore (SG); Han Kang Chong, Singapore (SG); Rani Ramamoorthy Saravanan, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 458 days.

(21) Appl. No.: 12/622,644

(22) Filed: Nov. 20, 2009

(65) Prior Publication Data

US 2011/0121182 A1    May 26, 2011

(51) Int. Cl.
*H03K 17/945* (2006.01)

(52) U.S. Cl.
USPC .......................................................... 250/341.1

(58) Field of Classification Search
CPC .............. H03K 17/945; H03K 17/9627; H03K 2217/94108
USPC ....................................................... 250/341.1
See application file for complete search history.

(56) References Cited

U.S. PATENT DOCUMENTS

| | | | |
|---|---|---|---|
| 7,486,386 B1 | 2/2009 | Holcombe et al. | |
| 2005/0001149 A1* | 1/2005 | Beuschel | 250/214 B |
| 2006/0016994 A1 | 1/2006 | Basoor et al. | |
| 2007/0228263 A1 | 10/2007 | Shen et al. | |
| 2008/0296478 A1 | 12/2008 | Hernoult | |
| 2009/0159900 A1 | 6/2009 | Basoor et al. | |
| 2010/0149113 A1* | 6/2010 | Hansson | 345/173 |

* cited by examiner

*Primary Examiner* — Constantine Hannaher

(57) ABSTRACT

An optical proximity sensor and corresponding methods of measuring crosstalk in the sensor are disclosed. The amount of crosstalk generated between the light emitter and the light detector of an optical proximity sensor is measured and quantified according to one of two methods. The measured crosstalk may then be stored in a register or memory location and then subtracted from signals representative of signals indicative of the nearby presence of an object to be detected combined with crosstalk, thereby removing so the contribution or effect of crosstalk on such signals.

23 Claims, 6 Drawing Sheets

METHODS, SYSTEMS AND DEVICES FOR CROSSTALK MEASUREMENT AND CANCELLATION IN OPTICAL PROXIMITY SENSORS

FIELD OF THE INVENTION

Various embodiments of the inventions described herein relate to the field of proximity sensors, and components, devices, systems and methods associated therewith.

BACKGROUND

Optical proximity sensors, such as the AVAGO TECHNOLOGIES™ HSDL-9100 surface-mount proximity sensor, the AVAGO TECHNOLOGIES™ APDS-9101 integrated reflective sensor, the AVAGO TECHNOLOGIES™ APDS-9120 integrated optical proximity sensor, and the AVAGO TECHNOLOGIES™ APDS-9800 integrated ambient light and proximity sensor, are known in the art. Such sensors typically comprise an integrated high efficiency infrared emitter or light source and a corresponding photodiode or light detector, and are employed in a large number of handheld electronic devices such as mobile phones, Personal Data Assistants ("PDAs"), laptop and portable computers, portable and handheld devices, amusement and vending machines, industrial or sanitary automation machinery and equipment, contactless switches, and the like.

Referring to FIG. 1, there is shown a prior art optical proximity sensor 10 comprising infrared light emitter 16, light emitter driving circuit 31, light detector or photodiode 12, light detector sensing circuit 34, metal housing or shield 18 with apertures 52 and 54, and object to be sensed 60. Light rays 15 emitted by emitter 16 and reflected as light rays 19 from object 60 (which is in relatively close proximity to optical proximity sensor 10 and within the detection range thereof) are detected by photodiode 12 and thereby provide an indication that object 60 is close or near to sensor 10.

As further shown in FIG. 1, optical proximity sensor 10 further comprises metal housing or shield 18 formed of metal and comprising apertures 52 and 54 located over light emitter 16 and light detector 12, respectively, such that at least a first portion of light 15 emitted by light emitter 16 passes through aperture 52, and at least a second portion of the first portion 19 of light reflected from object 60 in proximity to sensor 10 passes through aperture 54 for detection by light detector 12. As shown, metal housing or shield 18 may further comprise first and second modules 61 and 63 within which light emitter 16 and light detector 12 are disposed, respectively. The first and second modules 61 and 63 are separated by light barrier 25 to provide optical isolation between first and second modules 61 and 63.

Many optical proximity sensors include a metal shield, such as shield or housing 18 of the type shown in FIG. 1, to provide optical isolation between light emitter 16 and light detector or photodiode 12 so that undesired optical crosstalk between emitter 16 and detector 12 is minimized. See, for example, the Data Sheets corresponding to the AVAGO TECHNOLOGIES™ APDS-9120 Integrated Optical Sensors Preliminary Datasheet and the AVAGO TECHNOLOGIES™ APDS-9800 Integrated Ambient Light and Proximity Sensors Preliminary Datasheet, each of which is hereby incorporated by reference herein, each in its respective entirety.

Appreciable amounts of undesired crosstalk typically occur between light emitter 16 and light detector 12, notwithstanding the presence of barrier 25. Unfortunately, measuring or quantifying the amount of crosstalk in proximity sensors has proven to be a proposition fraught with substantial difficulty. What is need is an optical proximity sensor that is capable of accurately measuring or quantifying the actual amount of crosstalk that occurs between the light emitter and light detector sections thereof.

SUMMARY

In some embodiments, there is provided a method of measuring and cancelling crosstalk in an optical proximity sensor comprising emitting, from an infrared light emitter included in the sensor and operating under control of and operably connected to an integrated circuit (IC) comprising a processor, a first burst of infrared light pulses when an object to be detected is not within sensing proximity to the sensor, detecting, with a light detector included in the sensor and operating under control of and operably connected to the IC, during the first burst of light pulses a first signal corresponding to crosstalk occurring between the light emitter and the light detector, storing, in a first memory location or first register included in the IC, a first value corresponding to the first signal, emitting, from the infrared light emitter, a second burst of infrared light pulses when the object to be detected is within sensing proximity to the sensor, detecting, with the light detector, during the second burst of light pulses a second signal comprising a sum of the crosstalk and a proximity signal corresponding to light reflected from the object to be detected, storing, in a second memory location or second register included in the IC, a second value corresponding to the second signal, and subtracting the first value from the second value thereby to yield a third value corresponding to the proximity signal.

In other embodiments, there is provided a method of measuring crosstalk in an optical proximity sensor comprising emitting, from an infrared light emitter included in the sensor and operating under control of and operably connected to an integrated circuit (IC), a first burst of infrared light pulses, detecting, with a light detector included in the sensor and operating under control of and operably connected to the IC, during the first burst of light pulses an object located near the optical proximity sensor as indicated by a first output signal having an amplitude exceeding a predetermined threshold being generated by the light detector, the first signal representing a sum of crosstalk occurring between the light emitter and the light detector and a proximity signal corresponding to light reflected from the object, emitting, from the infrared light emitter, a second burst of infrared light pulses, detecting, with the light detector, the object having moved away from the optical proximity sensor during the second burst of light pulses as indicated by a second output signal having an amplitude falling below the predetermined threshold being generated by the light detector, emitting, from the infrared light emitter, a third burst of infrared light pulses following the second burst of light pulses, confirming, with the light detector, that the object remains moved away from the optical proximity sensor during the third burst of light pulses as indicated by a third output signal having an amplitude falling below the predetermined threshold being generated by the light detector, the third signal representing the amount of crosstalk generated by the proximity sensor, and storing in a register or memory location a digital representation of the third signal.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME PREFERRED EMBODIMENTS

Figure 1:
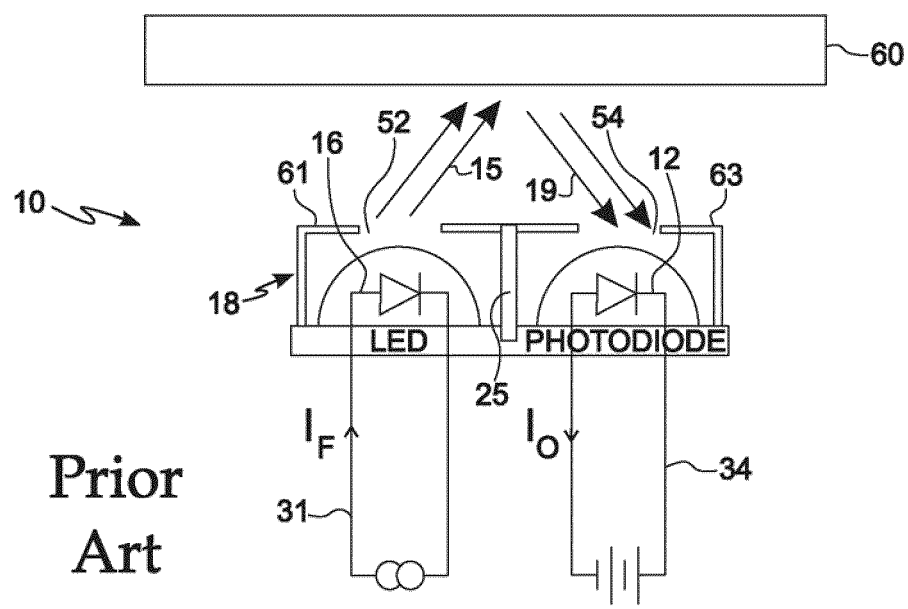
FIG. 1 shows a prior art optical proximity sensor and associated circuitry.
Figure 2:
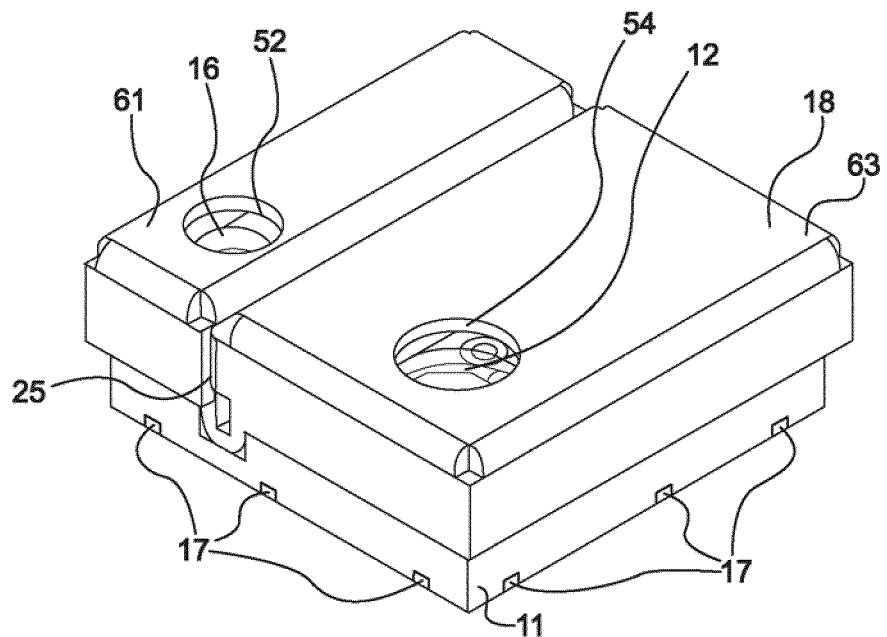
FIG. 2 shows a prior art optical proximity sensor with a metal shield or housing.

FIG. 2 shows one embodiment of art optical proximity sensor 10 with metal shield or housing 18. Optical proximity sensor 10 may contain, by way of example, a molded plastic or printed circuit board ("PCB") substrate 11 upon which are mounted LED 16 and light detector or photodiode 12. In one embodiment, substrate 11 is a printed circuit board having traces, wire bond pads and/or vias disposed thereon or therein. Conventional materials well known to those skilled in the art may be employed to form first substrate 11. Single-piece metal shield 18 covers LED 16 and light detector or photodiode 12 and contains a downwardly projecting light barrier 25 disposed therebetween. Electrical contacts 17 provide a means to establish electrical connections between proximity sensor 10 and external devices. Metal shield 18 is typically formed and thinned using conventional metal stamping techniques, and is affixed to the underlying substrate 11 by gluing.

Figure 3:
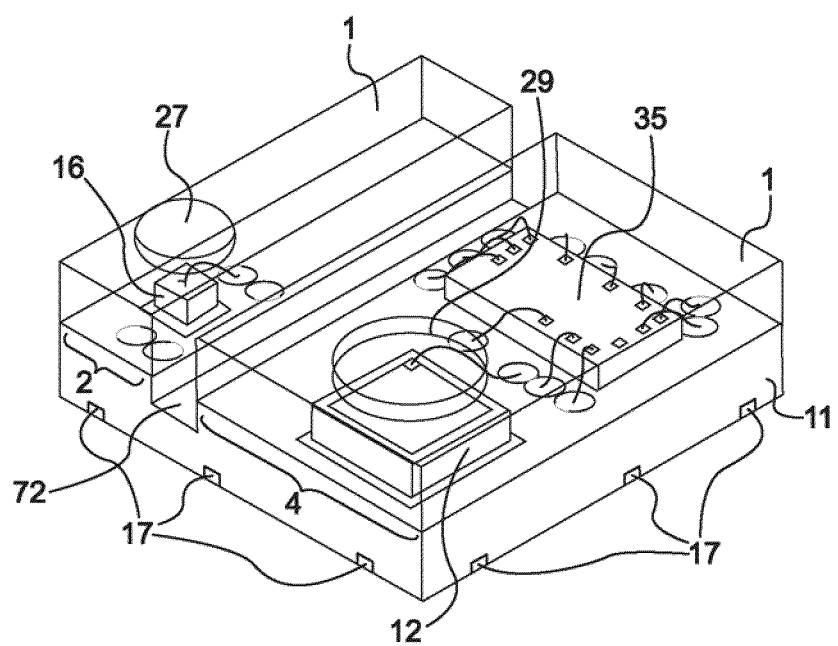
FIG. 3 shows a prior art optical proximity sensor with the shield of FIG. 2 removed therefrom.

FIG. 3 shows optical proximity sensor 10 of FIG. 2 without metal shield 18 disposed thereover. Optical proximity sensor 10 shown in FIG. 3 contains substrate 11 upon which are mounted light emitter or LED 16, light detector or photodiode 12, and integrated circuit 35, which according to one embodiment is an AVAGO TECHNOLOGIES™ APDS-9700 signal conditioning IC or ASIC (application specific integrated circuit) for optical proximity sensors, the data sheet for which is hereby incorporated by reference herein in its entirety. According to one embodiment, light detector 12 is an ASIC such as an AVAGO TECHNOLOGIES™ APDS-9120 or APDS-9180 integrated optical proximity sensor. According to one embodiment, light emitter 16 is a semiconductor infrared LED such as a Model No. TK116IRA TYNTEK™ AlGaAs/GaAs Infrared Chip, the data sheet for which is hereby incorporated by reference herein. Also shown in FIG. 3 are groove or channel 72, which is configured to accept the lower portions of light barrier 25 therein, light emitter section 2, light detector section 4, light emitter lens 27, light detector lens 29, and infrared (IR) pass molding material 1, which encapsulates some of the components disposed atop substrate 11.

Figure 4:
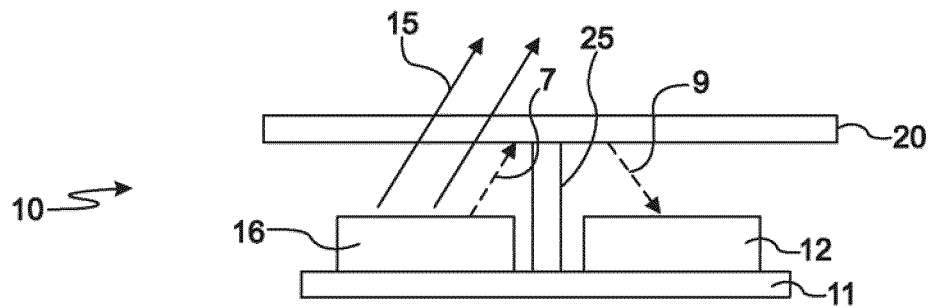
FIG. 4 shows a cross-sectional view of one embodiment of an optical proximity sensor having a window cover disposed thereover.

FIG. 4 shows one embodiment of an optical proximity sensor 10 comprising light emitter 16 and light detector 12 mounted on substrate 11 and separated from one another by light barrier 25. Light rays 15 are emitted by light emitter 16 for transmission through overlying cover 20, which in some applications is provided as part of the portable or other type of electronic device in which proximity sensor 10 is housed and mounted.

Referring now to FIGS. 3 and 4, while light rays 15 are transmitted through IR pass material 1, other reflected, diffracted or refracted IR radiation 7 and 9 can leak across to light detector 12 through molding material 1 and/or barrier 25, which manifests itself as undesired crosstalk or interference between light emitter 16 and light detector 12. This crosstalk degrades the performance of proximity sensor 10. Measuring or quantifying the amount of crosstalk or interference that occurs is desirable so that the contribution of crosstalk to measured desired proximity or detection signals can be subtracted or otherwise removed therefrom.

As shown in FIG. 4, while light rays 15 are transmitted through cover 20, other reflected, diffracted or refracted IR radiation 7 and 9 can leak across to light detector 12 through cover 20 and light barrier 25, which manifests itself as undesired crosstalk or interference between light emitter 16 and light detector 12, thereby degrading the performance of proximity sensor 10.

Figure 5:
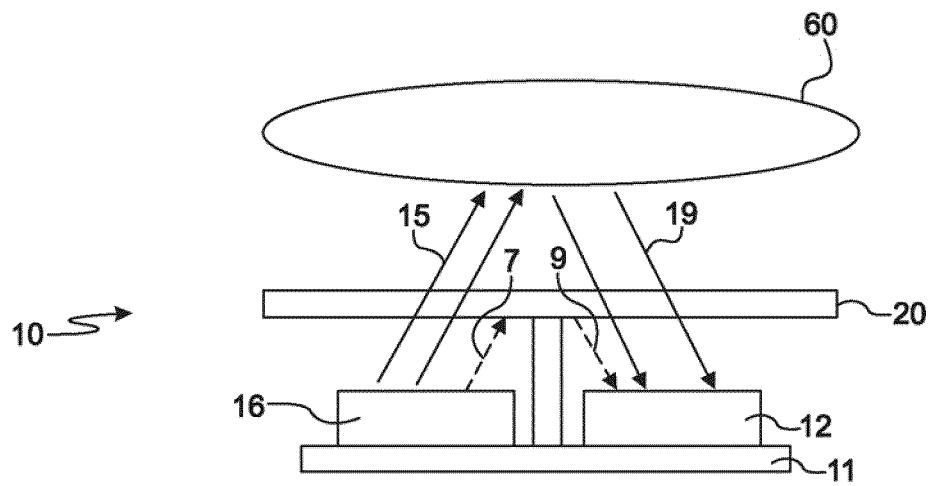
FIG. 5 shows a cross-sectional view of one embodiment of an optical proximity sensor having a window cover and object to be detected disposed thereover.

As further shown in FIG. 5, the amount of reflected, diffracted or refracted IR radiation 7 and 9, and resulting undesired crosstalk or interference between light emitter 16 and light detector 12, typically remains unaffected by the presence of object to be detected 60. Due to the gap between optical proximity sensor 10 and window cover 20, a small amount of light is generally reflected back towards light detector 12 as noise 9. Window cover 20 is generally optically transmissive and/or transparent and may be characterized by different thicknesses, which can lead to increasing the amount of crosstalk generated by optical proximity sensor 10 and cover 20, even though no object 60 blocks or is in proximity to sensor 10. Crosstalk must be quantified and measured before ameliorative action can be undertaken. The amount of crosstalk generated varies according to sensor type, individual sensor peculiarities or variations, the type of window employed with a sensor, alignment variations, the physical environment in which the sensor is being used, and other factors. Accordingly, measuring crosstalk in individual proximity sensors in a post-manufacturing setting is highly desirable.

Figure 6:
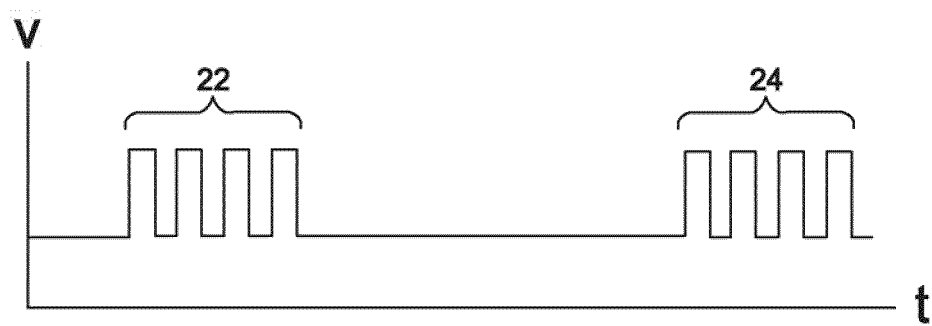
FIG. 6 shows representative bursts of infrared light pulses emitted by an LED light emitter.

FIG. 6 shows first and second bursts of infrared light pulses 22 and 24 emitted by light emitter 16 operating under the control of integrated circuit 35, which drives light emitter or LED 16. As shown in FIGS. 4 and 5, and as described above, some of the emitted infra-red light 15 is reflected back to the photodiode or photodetector of light detector 12 as undesired crosstalk or interference. When infrared light is reflected from object to be detected 60 (as shown in FIG. 5), the signals received by light detector 12 are stronger than in the case where object 60 is not near proximity sensor 10. By detecting successively reflected light rays 19, light detector 12 can determine whether object to be sensed 60 is approaching or moving away from proximity sensor 10. The current generated by the photodiode in light detector 12 is integrated and sampled by an analog-to-digital converter (ADC). The ADC counts are stored in registers or memory locations, and typically may be accessed by a host system or processor. In the case of a 12-bit ADC, the full range of counts available for proximity detection is usually 4095 counts. In many sensors crosstalk count magnitudes fall between about 200 counts and 400 counts. As a result, and in one embodiment, the useful range of counts for a 12-bit ADC employed to measure signals reflected from object to be detected 60 ranges between about 800 counts and about 4095 counts. According to one embodiment, this useful count can be subtracted from the crosstalk count.

Figure 7:
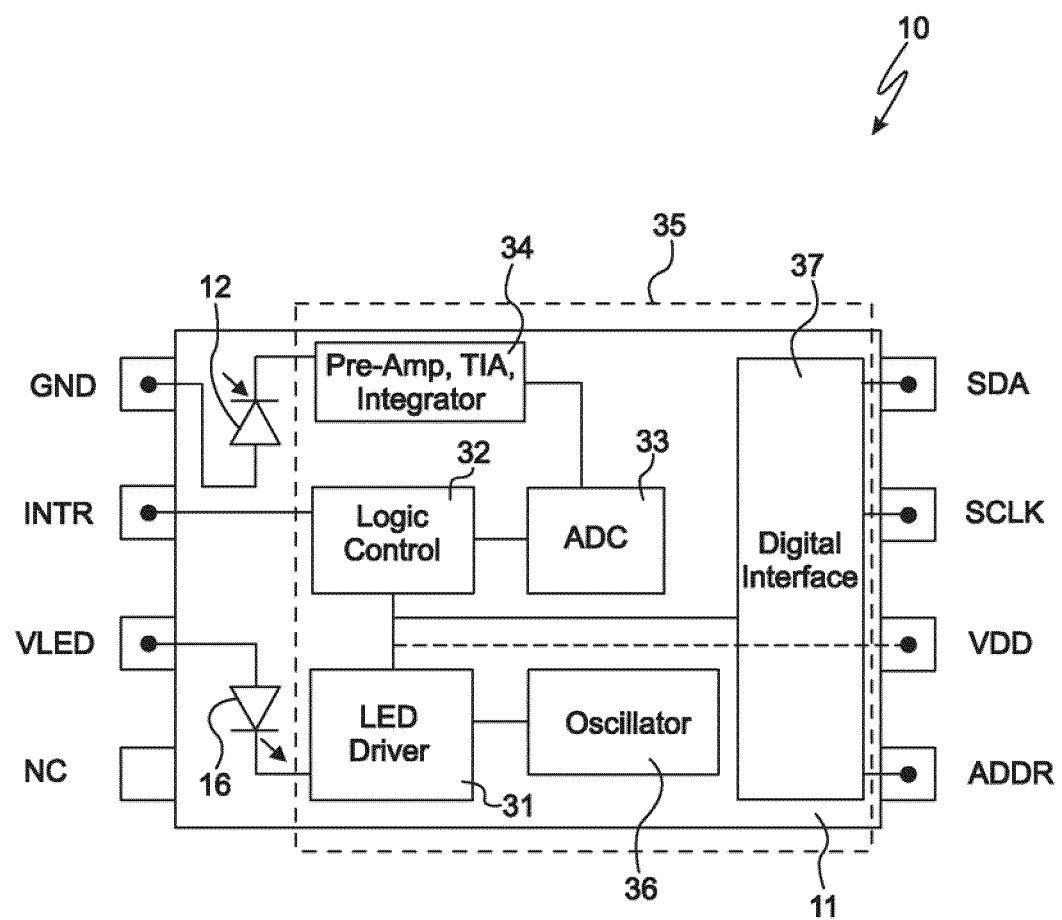
FIG. 7 shows one embodiment of electrical and electronic circuitry for an optical proximity sensor.

Referring now to FIG. 7, there is shown a block diagram of various electrical and electronic components according to one embodiment of optical proximity sensor 10. As shown, proximity sensor 10 comprises light emitter or light source 16 (which according to one embodiment is an LED emitting light having a wavelength around 940 nm), but which may be any suitable source of light), light detector or photodetector 16, and integrated circuit or ASIC 35, which is configured to drive LED 16 and receive and process reflected light 19 sensed by photodetector 12. According to one embodiment, integrated circuit or ASIC 35 is an AVAGO TECHNOLOGIES APDS-9180 ASIC (the data sheet for which is filed on even date herewith and is hereby incorporated by reference herein in its entirety), and is mounted along with LED 16 and photodetector 12 on a printed circuit board (PCB) carrier or substrate 11. As further shown in FIG. 7, integrated circuit or ASIC 35 includes LED driver circuit 31, digital logic control and register circuit 32, pre-amplifier circuit, trans-impedance amplifier and integrator circuit 34, ADC 33, oscillator 36 and digital interface 37 (which is preferably configured to provide I2C interfacing). Registers are accessed using I2C protocols to configure LED drive circuit parameters. Note that many other embodiments of the circuitry of optical proximity sensor 10 are contemplated in addition to those explicitly disclosed and described herein.

Figure 8:
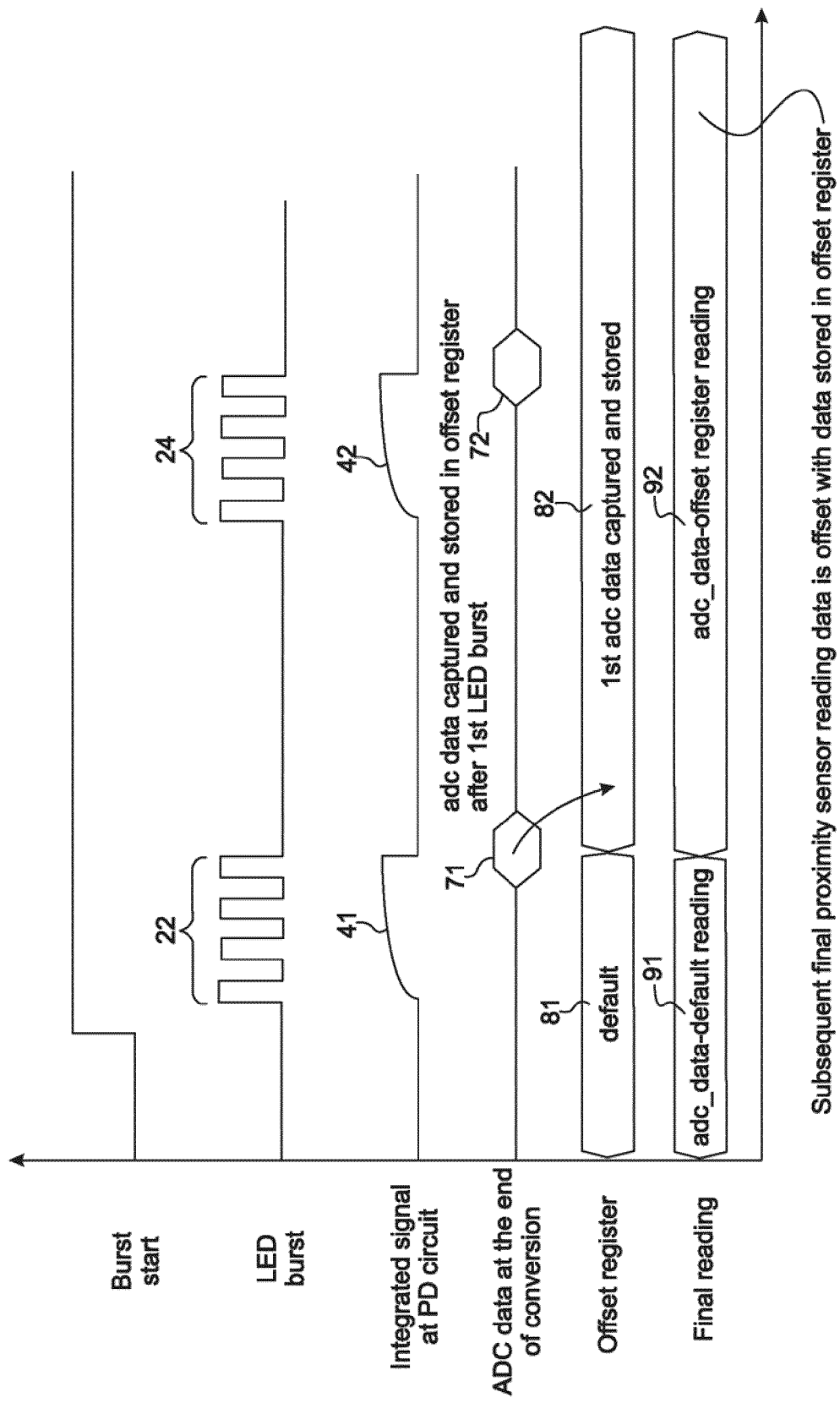
FIG. 8 illustrates one embodiment of one method of measuring the amount of crosstalk generated by an optical proximity sensor.

Referring now to FIG. 8, there is illustrated one embodiment of a method of measuring and cancelling crosstalk in proximity sensor 10. Crosstalk, indicated by integrated photodetector signal 41, is measured and stored in a register after a first burst of LED pulses 22 is emitted by light emitter 16. That is, a digital value corresponding to crosstalk signal 41 is generated by ADC 33 and stored in a corresponding register or memory location. The first burst of LED pulses 22 is reserved for measuring crosstalk. A necessary condition for the method of FIG. 8 is that there be no object to be sensed or detected 60 within sensing distance of proximity sensor 10 when the first burst of LED pulses 22 is emitted. As further shown in FIG. 8, the digital crosstalk value corresponding to signal 41 is stored in a register when the first burst of LED pulses 22 ends. Subsequent burst of LED pulses 24, and other subsequent bursts of LED pulses, are employed to measure or detect the presence of object to be detected or sensed 60 as object 60 approaches or recedes from proximity sensor 10.

Actual readings for the proximity values may then be offset from the crosstalk value stored in the register. The digital crosstalk value stored in the register may be updated when the proximity sensor is booted or started up, according to a predetermined schedule, when a command or instruction to update the crosstalk value is issued to proximity sensor 10, or when dictated by instructions programmed or pre-programmed into proximity sensor 10.

Continuing to refer to FIG. 8, it will now be seen that there is provided a method of measuring and cancelling crosstalk in optical proximity sensor 10 comprising emitting, from infrared light emitter 16 included in sensor 10 and operating under control of and operably connected to integrated circuit 35, a first burst of infrared light pulses 22 when object to be detected 60 is not within sensing proximity to proximity sensor 10. A first signal 41 is detected during the first burst of light pulses 22 that corresponds to crosstalk occurring between light emitter 16 and light detector 12. Light detector 12 is included in sensor 10 and operates under control of and is operably connected to integrated circuit integrated circuit 35. A first value corresponding to the first signal 41 is stored in a first memory location or first register included in integrated circuit 35.

Next, a second burst of infrared light pulses 24 is emitted from infrared light emitter 16 when object to be detected 60 is within sensing proximity to sensor 10. During the second burst of light pulses 24 a second signal 42 comprising a sum of the crosstalk and a proximity or detection signal corresponding to light reflected from the object to be detected 60 is detected or sensed by light detector 12. A second value corresponding to the second signal 42 is stored in a second memory location or second register included in integrated circuit 35 or in another device.

The first value may then be subtracted from the second value to yield a third value corresponding to the proximity signal. The third value may be stored in a third memory location or third register in integrated circuit 35 or in another device, and may be accessed from the integrated circuit or other device by a host processor operably connected to integrated circuit 35, as may the first and second values.

The host processor may then use the third value as representative of a purely reflected signal 19 having no crosstalk component included therein. Note further that crosstalk measurements may be taken a predetermined period of time after a burst of LED pulses has ended. In one such embodiment, crosstalk measurements are initiated between about 2 milliseconds and about 10 milliseconds after the burst of LED pulses ends.

Figure 9:
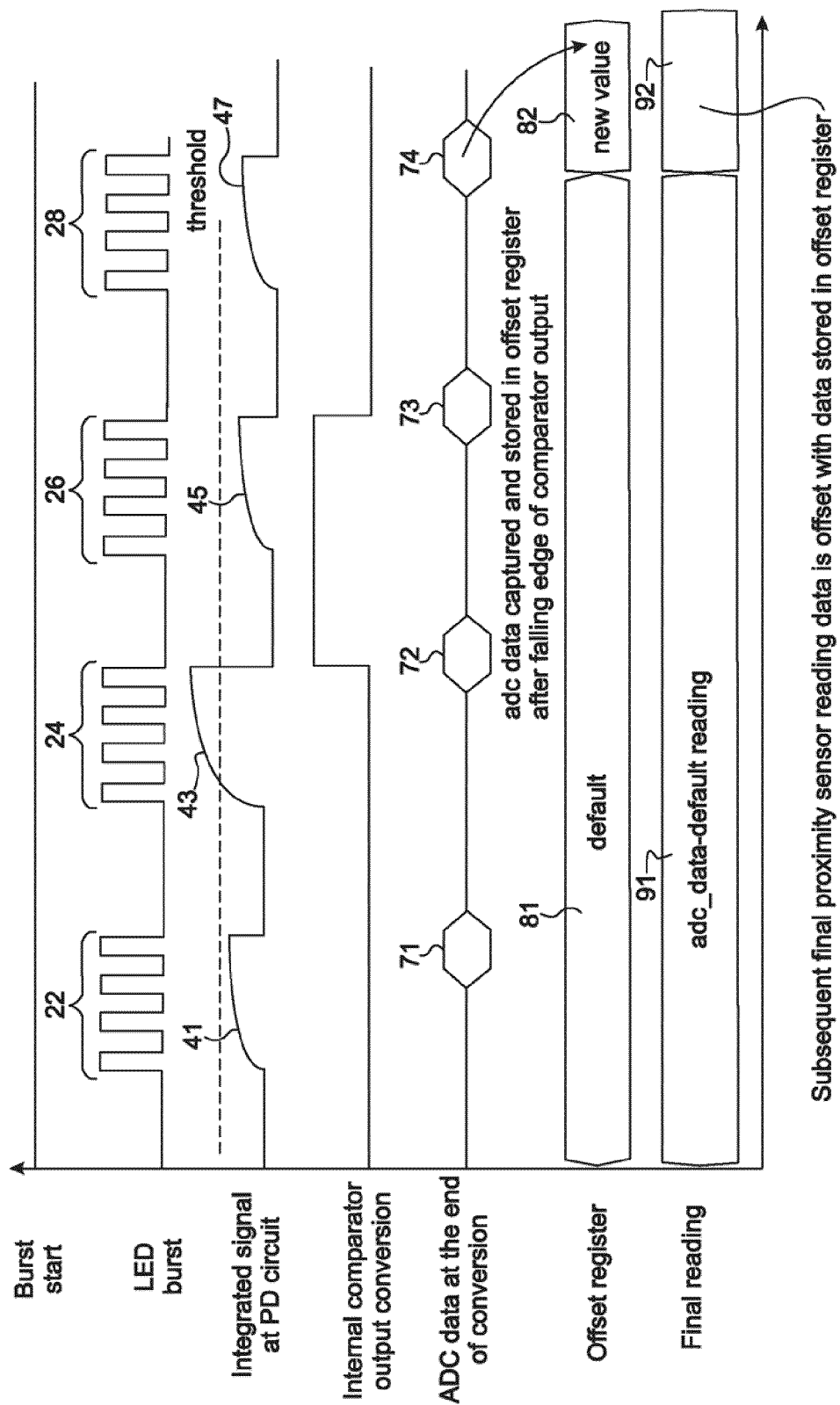
FIG. 9 illustrates one embodiment of another method of measuring the amount of crosstalk generated by an optical proximity sensor.

Referring now to FIG. 9, there is illustrated one embodiment of another method of measuring and cancelling crosstalk in proximity sensor 10. In one embodiment of the method illustrated in FIG. 9, crosstalk cannot be measured accurately unless the magnitude or amount of the crosstalk does not exceed a predetermined threshold for signals detected and integrated by the photodetector (PD). By way of example, and in one embodiment, the predetermined threshold is set to one-half the full scale measurement or reading.

Continuing to refer to FIG. 9, it will be seen that integrated photodetector signal 41 generated in response to an initial burst of LED pulses 22 does not exceed the threshold, and as a result the comparator does not change state from its logic low state. Integrated photodetector signal 43 generated in response to first burst of LED pulses 24 does exceed the threshold, however, in response to sensing the nearby presence of object to be detected 60, and as a result the comparator switches from its logic low state to a logic high state when first burst of LED pulses 24 ends. Integrated photodetector signal 45 generated in response to second burst of LED pulses 26 does not exceed the threshold, however, in response to object to be detected 60 having moved away from optical proximity sensor 10. As a result the comparator switches from its temporary logic high state to a logic low state when second burst of LED pulses 26 ends. Integrated photodetector signal 47 generated in response to third burst of LED pulses 28 yet again does not exceed the threshold in response to object to be detected 60 not being within detection range of optical proximity sensor 10. As a result, value 74 generated by the ADC is stored in a register as representative of the amount of crosstalk generated between light emitter 16 and light detector 12 when third burst of LED pulses 28 ends.

Note that the comparator switching from a logic high state to a logic low state after second burst of pulses 26 ends confirms that object to be detected 60 has moved beyond the detection range of optical proximity sensor 10, and it is at this point in time that the crosstalk signal may be measured accurately and subsequently stored. Crosstalk measurements are preferably initiated within a predetermined period of time after the comparator has switched back to its logic low state, typically between about 2 milliseconds and about 10 milliseconds after the third burst of LED pulses 26 has ended. In one embodiment, such a predetermined period of time is set at 5 milliseconds.

Continuing to refer to FIG. 9, it will now be seen that there is provided a method of measuring and cancelling crosstalk in optical proximity sensor 10 comprising emitting, infrared light emitter 16 included in sensor 10 and operating under control of and operably connected to integrated circuit 35, an initial burst of infrared light pulses 22. Light detector 12 included in sensor 10 and operating under control of and operably connected to IC 35 does not detect object to be detected 60 during the initial burst of light pulses, as indicated by signal 41 having an amplitude that does not exceed the predetermined threshold. Object to be detected 60 has moved within detection range of proximity sensor 10 during first burst of light pulses 24, however, as evidenced by first output signal 43 having an amplitude that exceeds the predetermined threshold. Signal 43 represents a sum of crosstalk occurring between light emitter 16 and light detector 12 and a proximity or detection signal 19 corresponding to light reflected from object 60. In response to having detected object 60 in proximity to sensor 10, the comparator switches to a logic high state when first burst of light pulses 24 ends.

Next, a second burst of infrared light pulses 26 is emitted by light emitter 16, and object 60 is confirmed to have moved away from optical proximity sensor 10 during the second burst of light pulses 26 as indicated by a second output signal 45 having an amplitude falling below the predetermined threshold being generated by light detector 12. When second burst of light pulses 26 ends, the comparator switches to the logic low state. The fact that object to be detected 60 remains beyond the detection range of proximity sensor 10 is confirmed during the third burst of infrared light pulses 28, where third output signal 47 generated by light detector 12 again falls below the predetermined threshold. Consequently, and following the third burst of light pulses 28, the third output signal 47 is converted by the ADC to a digital value representative of the amount of crosstalk generated by proximity sensor 10.

This digital value is stored in a register or other memory location for later retrieval and use in processing proximity or detection signals to remove the effects or contribution of crosstalk from such proximity or detection signals. As in the case of the method described above in connection with FIG. 8, the stored digital value representative of crosstalk may be subtracted from other stored values representative of the sum of the crosstalk signal and signals indicative of the proximity of object to be detected 60 within the range of detection of proximity sensor 10. A host processor or host system may also be configured to retrieve such digital values from proximity sensor 10.

Included within the scope of the present invention are methods of making and having made the various components, devices and systems described herein.

Those skilled in the art will understand that the various embodiments of the proximity sensor disclosed herein may be incorporated into portable electronic devices such as mobile telephones, smart phones, personal data assistants (PDAs), laptop computers, notebook computer, computers and other devices.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A method of measuring and cancelling crosstalk in an optical proximity sensor that comprises an integrated circuit (IC) with a processor, the method comprising:
    emitting, from an infrared light emitter included in the sensor and operating under control of and operably connected to the IC, a first burst of infrared light pulses when an object to be detected is not within sensing proximity to the sensor;
    detecting, with a light detector included in the sensor and operating under control of and operably connected to the IC, during the first burst of light pulses a first signal corresponding to crosstalk occurring between the light emitter and the light detector;
    integrating and sampling the first signal;
    storing, in a first memory location or first register of the IC, a first value corresponding to the integrated and sampled first signal;
    emitting, from the infrared light emitter, a second burst of infrared light pulses when the object to be detected is within sensing proximity to the sensor;
    detecting, with the light detector, during the second burst of light pulses a second signal comprising a sum of the crosstalk and a proximity signal corresponding to light reflected from the object to be detected;
    integrating and sampling the second signal;
    storing, in a second memory location or second register of the IC, a second value corresponding to the integrated and sampled second signal, and
    subtracting the first value from the second value thereby to yield a third value corresponding to the proximity signal.

2. The method of claim 1, wherein the first signal integrated and sampled using an analog-to-digital converter (ADC).

3. The method of claim 1, wherein the second signal integrated and sampled using an analog-to-digital converter (ADC).

4. The method of claim 1, further comprising storing the third value in a third memory location or third register.

5. The method of claim 1, further comprising accessing the third value from the IC with a host processor operably connected to the IC.

6. The method of claim 1, further comprising accessing the first value from the IC with a host processor operably connected to the IC.

7. The method of claim 1, further comprising accessing the second value from the IC with a host processor operably connected to the IC.

8. The method of claim 1, wherein the first value is subtracted from the second value in the processor of the IC.

9. The method of claim 1, wherein the first value is subtracted from the second value in a host processor operably connected to the IC.

10. A method of measuring crosstalk in an optical proximity sensor, comprising:
- emitting, from an infrared light emitter included in the sensor and operating under control of and operably connected to an integrated circuit (IC), a first burst of infrared light pulses;
- detecting, with a light detector included in the sensor and operating under control of and operably connected to the IC, during the first burst of light pulses an object located near the optical proximity sensor as indicated by an integrated and sampled first output signal having a measured number of counts within a predetermined amount of time exceeding a predetermined threshold the first output signal representing a sum of crosstalk occurring between the light emitter and the light detector and a proximity signal corresponding to light reflected from the object;
- integrating and sampling the first output signal;
- in response to detecting the object located near the optical proximity sensor, switching a comparator of the IC from a first logic state to a second logic state when the first burst of light pulses ends;
- emitting, from the infrared light emitter, a second burst of infrared light pulses;
- detecting, with the light detector, the object having moved away from the optical proximity sensor during the second burst of light pulses as indicated by an integrated and sampled second output signal having a measured number of counts within the predetermined amount of time being less than the predetermined threshold;
- in response to detecting the object having moved away from the optical proximity sensor during the second burst of light pulses, switching the comparator of the IC from the second logic state back to the first logic state when the second burst of light pulses ends;
- emitting, from the infrared light emitter, a third burst of infrared light pulses following the second burst of light pulses;
- confirming, with the light detector, that the object remains moved away from the optical proximity sensor during the third burst of light pulses as indicated by an integrated and sampled third output signal having measured number of counts within the predetermined amount of time being less than the predetermined threshold and as indicated by the comparator of the IC switching from the first logic state to the second logic state and back from the second logic state to the first logic state, the integrated and sampled third signal representing the amount of crosstalk generated by the proximity sensor.

11. The method of claim 10, further comprising storing, in a first memory location or first register of the IC, a first value corresponding to the integrated and sampled first signal.

12. The method of claim 10, further comprising storing, in a second memory location or second register of the IC, a second value corresponding to the integrated and sampled second signal.

13. The method of claim 10, further comprising storing, in a third memory location or third register of the IC, a third value corresponding to the integrated and sampled third signal.

14. The method of claim 10, wherein the first signal is integrated and sampled using an analog-to-digital converter (ADC).

15. The method of claim 10, the second signal integrated and sampled using an analog-to-digital converter (ADC).

16. The method of claim 10, wherein the third signal is integrated and sampled using an analog-to-digital converter (ADC).

17. The method of claim 10, further comprising accessing the measured number of counts from the first signal from the IC with a host processor operably connected to the IC.

18. The method of claim 10, further comprising accessing the measured number of counts from the second signal from the IC with a host processor operably connected to the IC.

19. The method of claim 10, further comprising subtracting the measured number of counts from the third value from the measured number of counts from the first value.

20. The method of claim 10, further comprising subtracting the measured number of counts from the third value from the measured number of counts from the first value in a host processor operably connected to the IC.

21. The method of claim 10, wherein the first logic state corresponds to a logic low state and wherein the second logic state corresponds to a logic high state.

22. The method of claim 10, further comprising emitting the third burst of light pulses within a predetermined period of time following the end of the second burst of light pulses.

23. The method of claim 22, wherein the predetermined period of time ranges between about 2 milliseconds and about 10 milliseconds.

* * * * *